United States Patent
Zuo et al.

(10) Patent No.: US 9,390,491 B2
(45) Date of Patent: Jul. 12, 2016

(54) SYSTEM AND METHOD FOR AUTOMATIC QUALITY CONTROL FOR ASSEMBLY LINE PROCESSES

(71) Applicant: Taiwan Semiconductor Manufacturing Co., Ltd., Hsin-Chu (TW)

(72) Inventors: Kewei Zuo, Xinbei (TW); Chien Rhone Wang, Hsin Chu (TW); Tzu-Cheng Lin, Hsinchu (TW); Chih-Wei Lai, Hsinchu (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 413 days.

(21) Appl. No.: 13/753,607

(22) Filed: Jan. 30, 2013

(65) Prior Publication Data

US 2014/0210982 A1    Jul. 31, 2014

(51) Int. Cl.
  *H04N 7/18*      (2006.01)
  *G06T 7/00*     (2006.01)

(52) U.S. Cl.
  CPC ....... *G06T 7/001* (2013.01); *G06T 2207/10056* (2013.01); *G06T 2207/30148* (2013.01); *G06T 2207/30152* (2013.01); *H04N 7/18* (2013.01)

(58) Field of Classification Search
  CPC ...... G02B 21/365; G02B 21/367; H04N 7/18; G06T 2207/30148; G06T 7/001; G06T 7/0004
  USPC ............................. 348/80, 79, 126; 382/149
  See application file for complete search history.

(56) References Cited

U.S. PATENT DOCUMENTS

| 5,619,429 | A  | * | 4/1997  | Aloni et al. | 700/279 |
| 6,539,106 | B1 | * | 3/2003  | Gallarda | G01R 31/307 |
|           |    |   |         |          | 382/149 |
| 2002/0168099 | A1 | * | 11/2002 | Noy | 382/149 |

* cited by examiner

*Primary Examiner* — Michael Lee
(74) *Attorney, Agent, or Firm* — Duane Morris LLP

(57) ABSTRACT

A system and method is disclosed for a quality control and/or inspection procedure for assembly line processes. The disclosed system and method enable automatic optical inspection of a device during different stages of manufacture as well as in its finished form. The disclosed system and method enable the automatic quality control process to be self-learning, dynamic, and to identify and classify defects in real time.

18 Claims, 4 Drawing Sheets

SYSTEM AND METHOD FOR AUTOMATIC QUALITY CONTROL FOR ASSEMBLY LINE PROCESSES

BACKGROUND

Modern assembly line manufacturing processes are typically highly automated in terms of operations necessary to manipulate materials and devices in order to create a finished product. Associated quality control processes, which include, among other things, inspection of the manufactured product both during manufacture and as a finished product, detection of defects, and evaluation and correction of manufacturing processes that cause defects, often rely on human skill, knowledge, and experience.

Current assembly line processes may employ high-tech inspection devices such as x-ray and/or acoustic imagers, and the images created by these devices are manually analyzed at least once or twice by one or more engineers and/or assembly line operators.

DETAILED DESCRIPTION

With reference to the figures where like elements have been given like numerical designations to facilitate an understanding of the present subject matter, various embodiments of a system and method for compensating for timing misalignments are described. In order to more fully understand the present subject matter, a brief description of applicable circuitry will be helpful.

A system and method is disclosed for automatic quality control for assembly line processes. The innovative system and method enable automatic optical inspection of a device during different stages of manufacture as well as in its finished form. Embodiments of the present subject matter enable the automatic quality control process to be self-learning, dynamic, and to identify and classify defects in real time.

Figure 1:
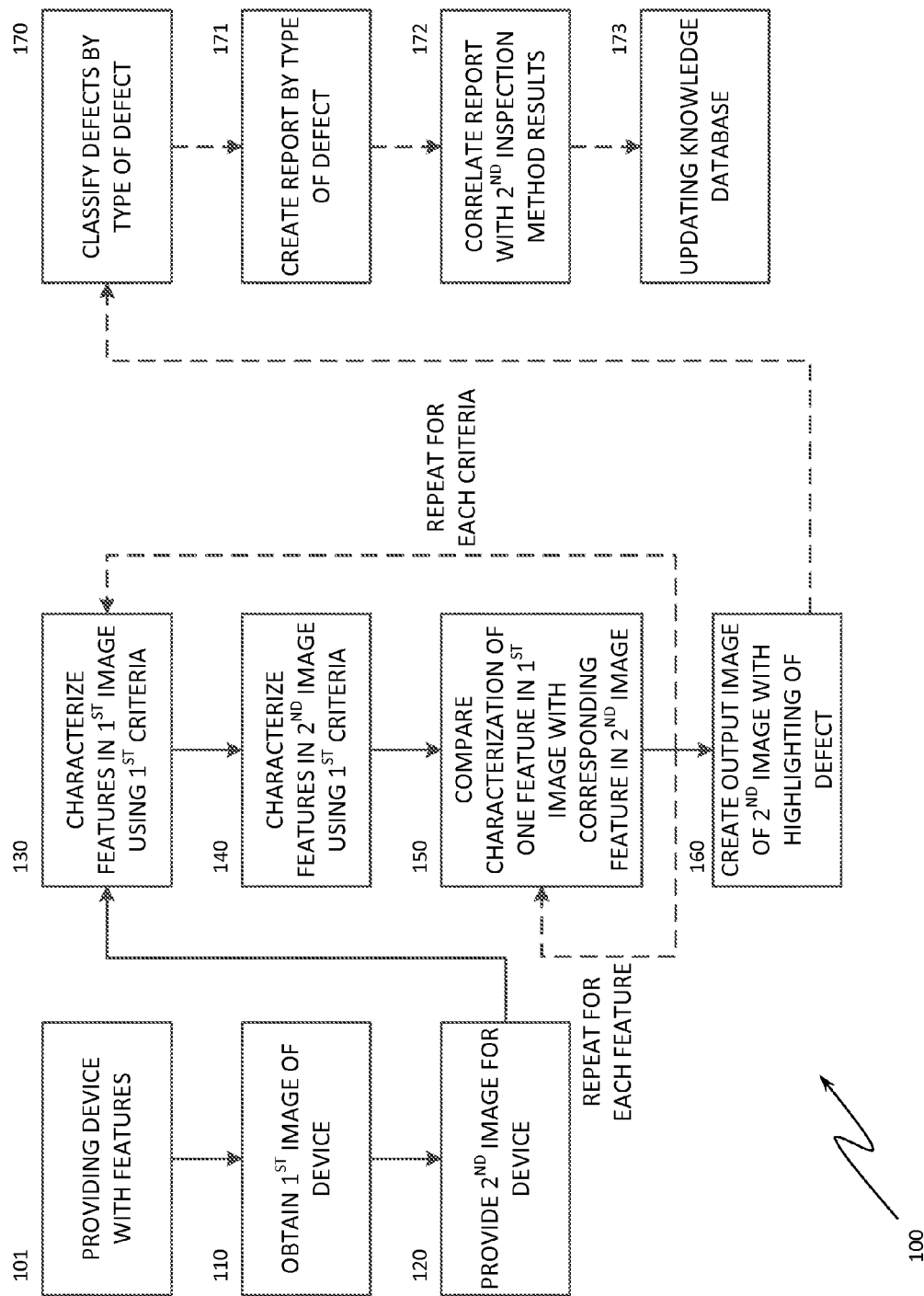
FIG. 1 is a flow chart for methods for quality control processes according to embodiments of the present subject matter.

Referring to FIG. 1, a flow chart 100 for methods for quality control processes and/or inspection procedures according to embodiments of the present subject matter is presented. At block 101, a device having certain features is provided. The device may be a chip (such as an integrated circuit chip), a wafer, or a die, for use in an electronic circuit, as is known in the art. Alternatively, the device may be a "boat" which is typically comprised of 18 chips. In certain embodiments, the chip is used in a "flip chip" process, also known as a controlled collapse chip connection ("C4") process, for electrically connecting the chip to external circuitry, as is known in the art. In other embodiments, the chip is used in well-known wire bonding processes. The features of the device, or chip, may be solder connections such as, but not limited to, solder dots, solder bumps, C4 bumps, microbumps, or other similar structures used to electrically and/or mechanically interconnect the chip with external circuitry.

At block 110, a first image of the device is obtained. In some embodiments, the first image is obtained using a C-Mode Scanning Acoustic Microscope ("C-SAM"). The C-SAM may take more than one image of the device. For example, in some embodiments the C-SAM will take nine images of a chip, and for a boat of 18 chips a total of 162 images will be taken. Typically, the images are digital images. At block 120, a second image for the device is provided where the second image is a benchmark image, which typically is a digital image. The benchmark image may be an idealized image (e.g., the benchmark image may not be an actual image of the device but rather a model image for what the particular device should look like at a distinct stage of a manufacturing process) or the benchmark image may be a digital image which is created based on previously obtained images for similar devices at the distinct stage of the manufacturing process.

At block 130, the features in the first image of the chip are characterized. While the following discussion uses the term "chip", those of skill in the art will readily understand that the discussion also pertains to boats, dies, wafers, and other similar devices. In some embodiments where the features are solder connections, the characterization of the features is obtained using one or more of the following criteria: area of the solder connection, roundness of the solder connection, convex area of the solder connection, perimeter of the solder connection, and extent of the solder connection. These criteria may each be used to characterize the solder connections and, in some embodiments, the priority of characterizing the solder connection with these criteria is area, roundness, convex area, perimeter, and extent. Other feature extraction methods include solder pixel summary values such as values based on a maximum or minimum number of pixels covered by a feature. Likewise, additional feature extraction methods may be based on a standard deviation, mean, percentage, or median determination. As will be obvious to those of skill in the art, other criteria may be used to characterize the features in the first image and are contemplated by this disclosure.

As a non-limiting example, a solder connection made on a chip is generally circular in nature, although the solder connection may not be perfectly circular. Therefore, a major axis length can be determined and from that determination well-known geometric equations for a circle can be employed to determine the criteria of area and perimeter. The criteria of roundness is the ratio of area to the square of the diameter as follows:

$$\text{Roundness} = \frac{4A}{\pi D^2}$$

where A is area and D is diameter

For the criteria of convex area, the convex area is the area of a specific shape. In mathematics, the Convex Hull or Convex Envelope for a set of points X in a real vector space V is the minimal convex set containing X.

$$H_{convex}(X) = \left\{ \sum_{i=1}^{k} \alpha_i x_i \,\middle|\, x_i \in X, \alpha_i \in \mathbb{R}, \alpha_i \geq 0, \sum_{i=1}^{k} \alpha_i = 1, k = 1, 2, \ldots \right\}.$$

For the criteria of extent, the extent is the Scalar that specifies the ratio of pixels in the region to pixels in the total bounding box. This is computed as the area of the region divided by the area of the bounding box.

In some embodiments where the first image is a digital image, the characterization of a feature using the above-mentioned criteria is pixel-based, where the length of a side of a pixel is a known unit of length. As a non-limiting example, the length of a pixel may equal 0.5 micrometers. Naturally, other scales are contemplated by the present disclosure. The characterizations of the feature may be determined, for example, as follows: if the diameter (e.g., the major axis length) of a feature (e.g., a solder connection) is X pixels, then the criteria of area, roundness, convex area, perimeter, and extent can be determined using either well-known geometric equations or the equations mentioned above.

At block 140, the features in the second image for the chip are characterized using the same criteria and methodology as described above as used for characterizing the features in the first image of the chip. At block 150, the characterization of a particular feature in the first image is compared with the characterization of the corresponding feature in the second image. The comparison of the characterizations is based on a comparison of the criteria for the feature in the first image with the same criteria for the corresponding feature in the second image. If the criteria are not within a predetermined threshold, then a defect is noted for the chip which contains the feature. As a non-limiting example for the criteria of area, if the area of the feature in the first image differs from the area of the corresponding feature in the second image by a predetermined amount (e.g., number of pixels), then a defect for that feature is noted.

In some embodiments, each criteria used to characterize a particular feature in the first image of the chip is compared with the same criteria for the corresponding feature in the second image for the chip. Once each criteria is compared, the process is repeated for a second feature. In some embodiments, a given criteria is used to characterize a first feature in the first image to its corresponding feature in the second image and then the same given criteria is used to characterize a second feature in the first image to its corresponding feature in the second image. Thus, it is contemplated, in some embodiments, that each feature will be compared with its corresponding feature using each criteria. In some embodiments, if a predetermined number of defects are noted for a chip, the process may end prior to each feature being compared to its corresponding feature using each criteria.

At block 160, an output image is created from the comparison of the characterizations. The output image typically is a digital image. In some embodiments, the output image is based on the second image and includes highlighted areas representing defects found during the comparison of the first image and the second image.

In further embodiments, at block 170, each defect noted is automatically classified by a type of defect in accordance with a predetermined classification system. Exemplary classifications of defects include, but are not limited to, bridge defects, cold joint defects, solder void defects, missing bump defects, and die shift defects, as are known in the art. Not all of the aforementioned defects need be utilized for any particular device. The results of the classification can be used to identify areas or process steps in the manufacturing procedure that are creating the defects in the device. Thus, the quality control system is a self-learning procedure. Additionally, the predetermined amount of difference in the comparison of the characterization of features can be automatically adjusted.

At block 171, a report is created which includes the number of defects noted for each of the classifications of defects used. The report can be based on the device, whether it be an individual feature, a die, a chip, a boat, or some other apparatus. In a still further embodiment, at block 172 the data in the report can be correlated with the results from a second inspection method, such as an X-ray inspection method, as is known in the art. If the results of the correlation are acceptable, at block 173, a knowledge database is updated with information from the device being inspected/undergoing a quality control process. If the results of the correlation are not acceptable, the device may be discarded but the information from the correlation may be further used to identify areas or process steps in the manufacturing procedure that are creating the defects in the device.

Figure 2:
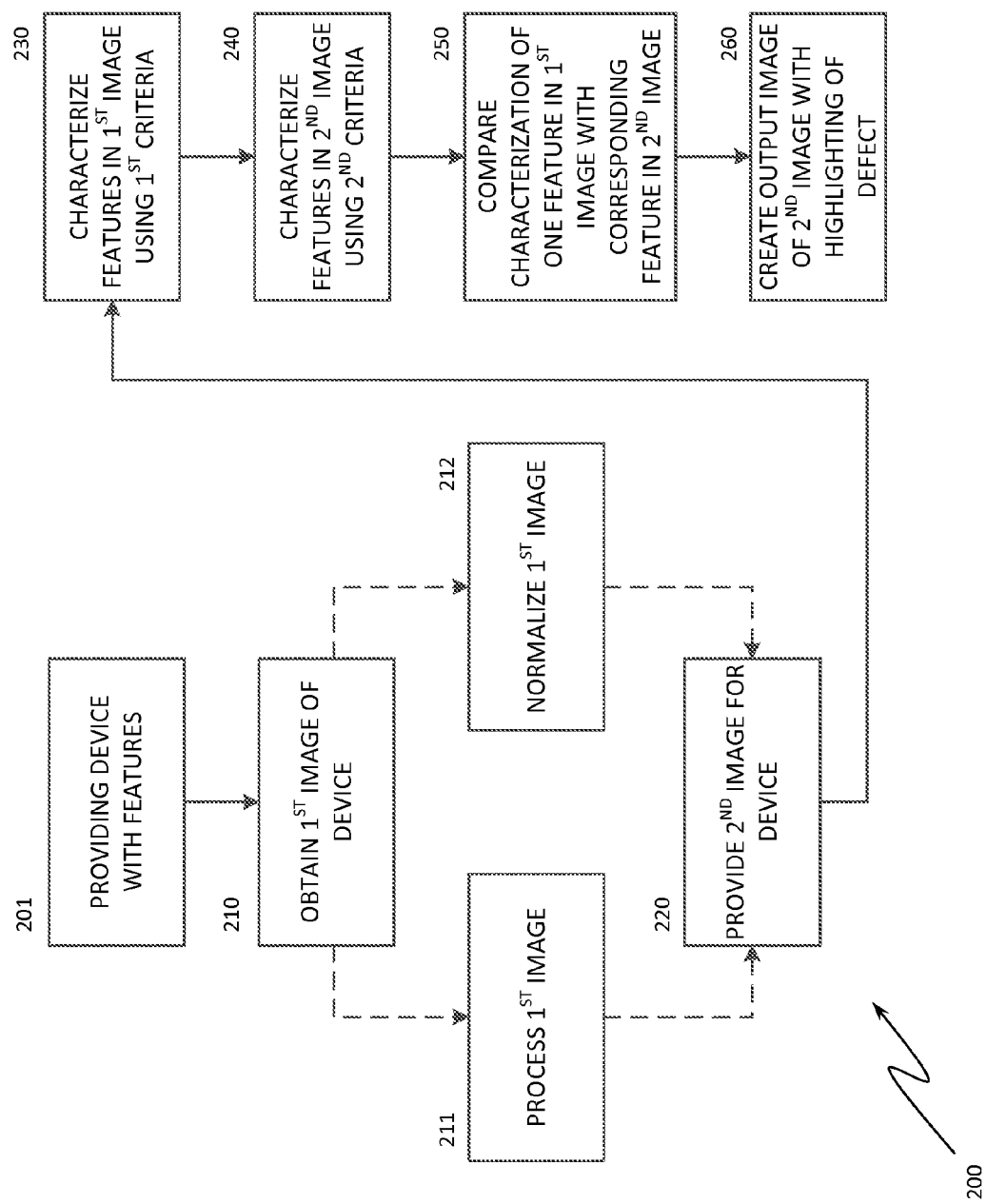
FIG. 2 is another flow chart for methods for quality control processes according to other embodiments of the present subject matter.

With attention now drawn to FIG. 2, flow chart 200 is presented for methods for quality control processes according to embodiments of the present subject matter. In flow chart 200, blocks 201, 210, 220, 230, 240, 250, and 260 correspond to blocks 101, 110, 120, 130, 140, 150, and 160, respectively, in flow chart 100 and the description of the blocks in flow chart 100 apply to the corresponding blocks in flow chart 200.

At block 211 in flow chart 200, the first image of the device is processed using a predetermined background filter where exemplary background filters include, but are not limited to, a binary filter, a gray scale filter, an image enhancement filter, and combinations thereof.

At block 212, the first image of the device is normalized using one or more normalization processes where exemplary normalization processes include, but are not limited to, image resolution processing, scale processing, device rotation processing, and device tilt angle processing.

Figure 3:
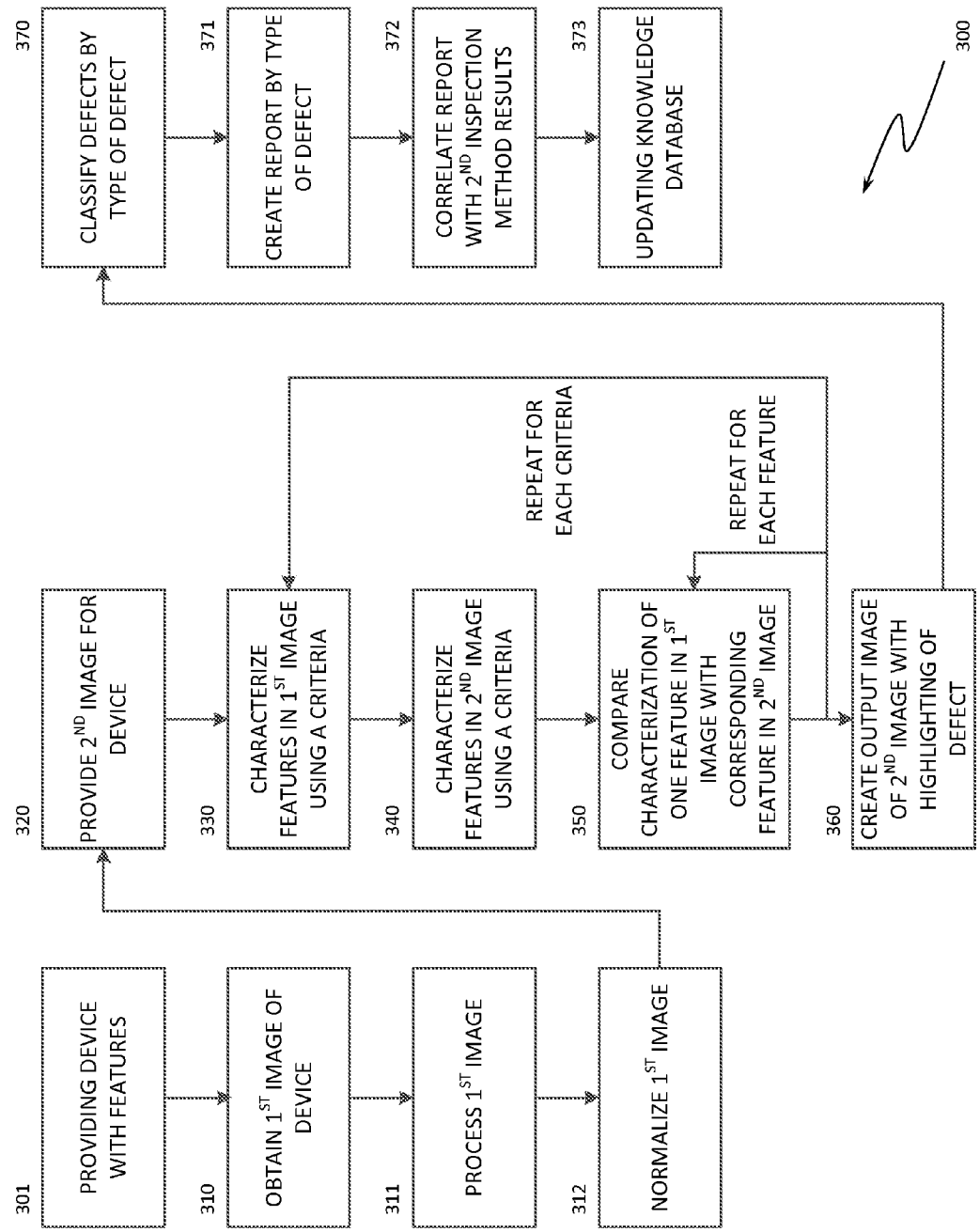
FIG. 3 is yet another flow chart for a method for a quality control process according to another embodiment of the present subject matter.

Considering now FIG. 3, flow chart 300 is presented for a method for a quality control process according to an embodiment of the present subject matter. At block 301, a device having certain features is provided, as described above. At block 310, a first image of the device is obtained, as described above. At block 311, the first image of the device is processed using a predetermined background filter where exemplary background filters include, but are not limited to, a binary filter, a gray scale filter, an image enhancement filter, and combinations thereof. At block 312, the first image of the device is normalized using one or more normalization processes where exemplary normalization processes include, but are not limited to, image resolution processing, scale processing, device rotation processing, and device tilt angle processing.

At block 320, a second image for the device is provided. As described above, the second image is a benchmark image, which typically is a digital image. At block 330, the features in the first image of the device are characterized, as described above. At block 340, the features in the second image for the device are characterized using the same criteria and methodology used for characterizing the features in the first image of the device, as described above. At block 350, the characterization of a particular feature in the first image is compared with the characterization of the corresponding feature in the second image, as described above. The comparison of the characterization is based on a comparison of the criteria for the feature in the first image with the same criteria for the corresponding feature in the second image. Once a comparison is made for the selected feature using the characterization based on the selected criteria, the comparison process of block 350 is repeated for a second feature as shown in flow chart 300. This loop repeats for each feature of the device. When each feature of the device is characterized using the first criteria, the process is repeated for a second criteria, as shown in flow chart 300, until each criteria has been selected.

At block 360, an output image is created from the comparison of the characterizations, as described above. At block 370, each defect noted is automatically classified by a type of defect in accordance with a predetermined classification system, as described above. Exemplary classifications of defects include, but are not limited to, bridge defects, cold joint defects, solder void defects, missing bump defects, and die shift defects, as are known in the art. The results of the classification can be used to identify areas or process steps in the manufacturing procedure that are creating the defects in the device. Thus, the quality control system is a self-learning procedure. Additionally, the predetermined amount of difference in the comparison of the characterization of features can be automatically adjusted.

At block 371, a report is created which includes the number of defects noted for each of the classifications of defects used, as described above. At block 372, the data in the report can be correlated with the results from a second inspection method, such as an X-ray inspection method, as described above. If the results of the correlation are acceptable, at block 373, a knowledge database is updated with information from the device being inspected/undergoing a quality control process, as described above. If the results of the correlation are not acceptable, the device may be discarded but the information from the correlation may be further used to identify areas or process steps in the manufacturing procedure that are creating the defects in the device.

Figure 4:
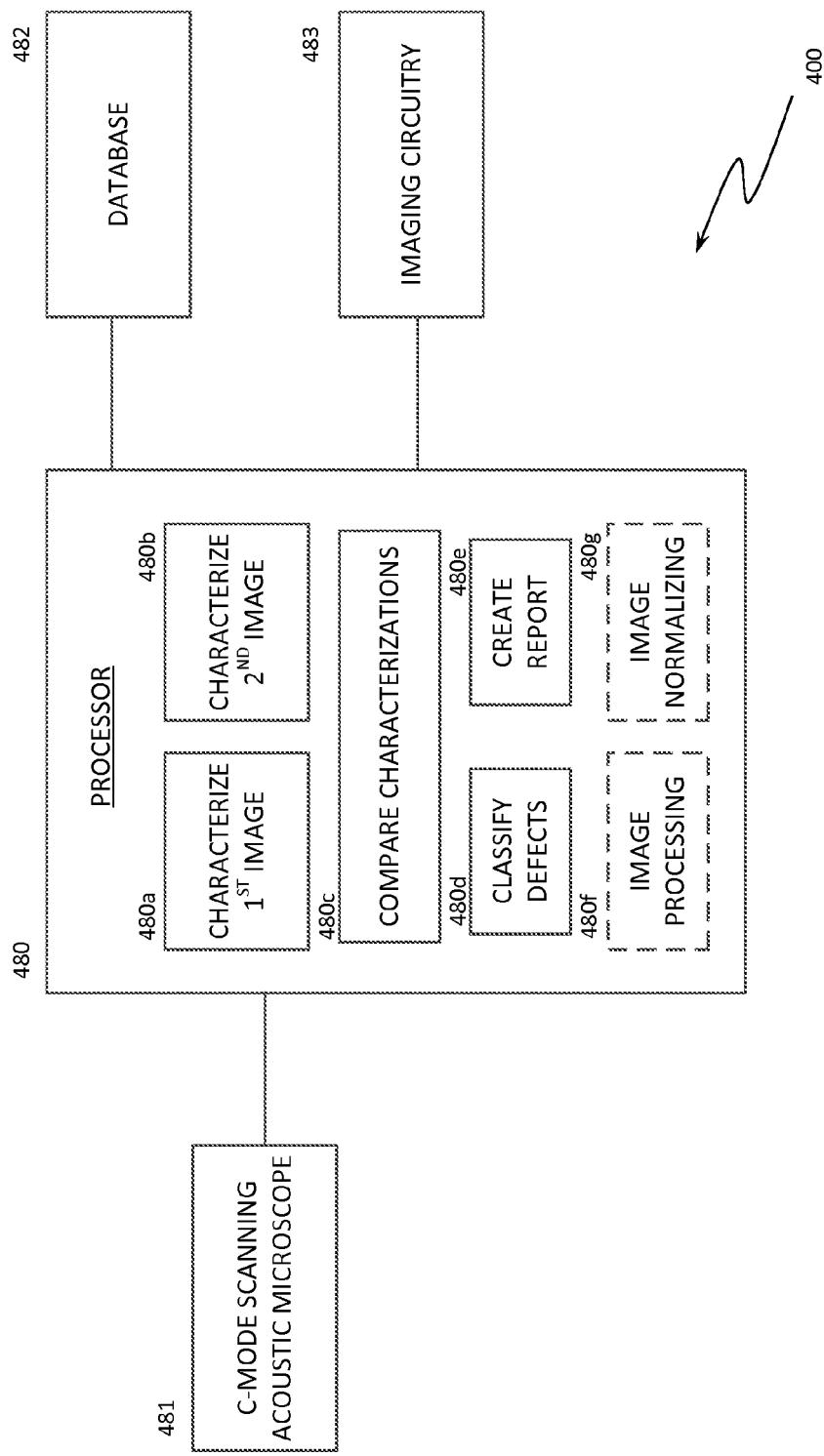
FIG. 4 is an illustration of a functional schematic diagram for a system for a quality control process according to an embodiment of the present subject matter.

Turning now to FIG. 4, a system 400 is presented as a functional schematic diagram for a quality control process and/or for inspecting a device according to an embodiment of the present subject matter. The device includes one or more features, as described above with respect to block 101 of flow chart 100. A C-mode scanning acoustic microscope ("C-SAM") 481 obtains a first image of the device undergoing the quality control and/or inspection process. The first image is described above with respect to block 110 in flow chart 100. Operably connected to the C-SAM is a processor 480. In some embodiments, the processor 480 is programmed to perform a number of functions. One function, 480a, characterizes each of the plurality of features in the first image of the device using a first criteria, as discussed above with respect to block 130 in flow chart 100. Another function, 480b, characterizes each of the plurality of features in the second image for the device using the same criteria and methodology as described above as used for characterizing the features in the first image of the device. Another function, 480c, compares the characterization of a particular feature in the first image with the characterization of the corresponding feature in the second image, as described above with respect to block 150 in flow chart 100. The comparison of the characterizations is based on a comparison of the criteria for the feature in the first image with the same criteria for the corresponding feature in the second image. If the criteria are not within a predetermined threshold, then a defect is noted for the device. Yet another function, 480d, automatically classifies defects determined by the comparison function 480c by a type of defect in accordance with a predetermined classification system, as described above with respect to block 170 in flow chart 100. Still another function, 480e, creates an output report which includes the number of defects noted for each of the classifications of defects used.

In a further embodiment, the processor 480 includes a function, 480f, which processes the first image of the device using a predetermined background filter as described above with respect to block 211 in flow chart 200. In a still further embodiment, the processor 480 includes a function, 480g, which normalizes the first image of the device using one or more normalization processes as described above with respect to block 212 in flow chart 200. The normalizing process includes, but is not limited to, one or more of image resolution processing, scale processing, device rotation processing, and device tilt angle processing.

Operably connected to the processor 480 is database 482. The database 482 stores a benchmark image and an updated version of the benchmark image as described above with respect to block 120 in flow chart 100. The processor 480 creates an updated version of the benchmark image based on the comparison of the characterization of one of the plurality of features in the first image with the characterization of the corresponding feature in the second image. Also operably connected to the processor 480 is imaging circuitry 483 which creates an output image comprising the first image with a highlighted area where the highlighted area includes one or more defects as determined by the comparison function 480c, as described above with respect to block 160 in flow chart 100.

As discussed above, an embodiment of the present subject matter includes a method for a quality control and/or an inspection procedure including providing a device having a plurality of features, obtaining a first image of the device, providing a second image wherein the second image is a benchmark image for the device, characterizing each of the plurality of features in the first image using a first predetermined criteria, characterizing each of a plurality of features in the second image using the first predetermined criteria, comparing the characterization of one of the plurality of features in the first image with the characterization of the corresponding feature in the second image, and creating an output image comprising the first image with a highlighted area wherein the highlighted area comprises a defect determined from the comparison. The characterization comparison may be repeated for each of the plural features. The characterizing of the features in the first and second images, along with the comparison of the characterizations, may be repeated for each of a predetermined number of criteria.

In a further embodiment, each defect is classified by a type of defect according to a predetermined classification system; and a report is created which includes the number of defects by type of defect. Additionally, data in the report is correlated with data from a second inspection method, and a knowledge database is updated with at least one of a result of the comparison of characterization of one feature, and a result of the correlation.

A further embodiment of the present subject matter includes processing the first image using a predetermined background filter, where the background filter includes one or more of a binary filter, a gray scale filter, and an image enhancement filter; and performing a normalizing procedure of the first image, where the normalizing procedure includes one or more of image resolution processing, scale processing, device rotation processing, and device tilt angle processing.

According to an embodiment of the present subject matter, a quality control and/or inspection system is described for inspecting a device having a plurality of features. The system includes a C-mode scanning acoustic microscope ("C-SAM") which is used to obtain a first image of the device, a processor operably connected to the C-SAM where said processor is programmed to: characterize each of the plurality of features in the first image using a first predetermined criteria, characterize each of a plurality of features in a second image of the device using the first predetermined criteria where the second image is a benchmark image for the device, compare the characterization of one of the plurality of features in the first image with the characterization of the corresponding feature in the second image to thereby identify a defect, classify the defect by a type of defect according to a predetermined classification system, and create a report including a number of defects by type of defect. Furthermore, the system includes a database operably connected to the processor where the database stores the benchmark image and an updated version of the benchmark image. The system also includes imaging circuitry operably connected to the processor for creating an output image comprising the first image with a highlighted area where the highlighted area comprises the defect. The processor creates an updated version of the benchmark image based on the comparison of the characterization of one of the plurality of features in the first image with the characterization of the corresponding feature in the second image.

In a further embodiment of the system, the processor is further programmed to process the first image using a predetermined background filter, and normalize the first image using at least one of the following normalizing procedures: image resolution processing, scale processing, device rotation processing, and device tilt angle processing.

While some embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

We claim:

1. A method for an inspection procedure, the method comprising the steps of:
   (a) providing a device having a plurality of features;
   (b) obtaining a first image of the device;
   (c) providing a second image wherein the second image is a benchmark image for the device;
   (d) after step (c), selecting a first criteria and extracting one or more of the plurality of features in the first image using the selected first criteria;
   (e) dynamically extracting the one or more of the plurality of features in the second image in real time using the same first criteria after the one or more of the plurality of features in the first image have been extracted;
   (f) comparing the extracted one or more of the plurality of features in the first image with the extracted one or more corresponding features in the second image;
   (g) creating an output image comprising the first image with a highlighted area wherein the highlighted area comprises one or more defects determined from the comparison;
   (h) classifying each defect by a type of defect according to a predetermined classification system;
   (i) creating a first report including a number of defects by type of defect;
   (j) correlating data in the first report with data in a second report created from a second, different inspection method performed on the device;
   (k) if the correlation between the data in the first report and data in the second report meets a predetermined acceptable level, updating the second image based on a comparison of the first image with the second image to create an updated benchmark image; and
   (l) storing the updated benchmark image in a database.

2. The method of claim 1 further comprising the step of:
   (m) repeating step (f) for each of the plurality of features.

3. The method of claim 2 further comprising the step of:
   (n) repeating steps (d) through (f) and step (m) using a second selected criteria.

4. The method of claim 1 wherein the predetermined classification system includes classifications selected from the group consisting of: bridge, cold joint, solder void, missing bump, and die shift.

5. The method of claim 1 wherein the second, different inspection method is an X-ray inspection method.

6. The method of claim 1 further comprising the step of:
   (m) processing the first image using a predetermined background filter, wherein the background filter is selected from the group consisting of: a binary filter, a gray scale filter, an image enhancement filter, and combinations thereof.

7. The method of claim 1 further comprising the step of:
   (m) normalizing the first image, wherein the normalizing is selected from the group consisting of: image resolution processing, scale processing, device rotation processing, and device tilt angle processing.

8. The method of claim 1 wherein the first image is obtained using a C-mode scanning acoustic microscope.

9. The method of claim 1 wherein the first predetermined criteria is selected from the group consisting of: area, roundness, convex area, perimeter, and extent.

10. The method of claim 1 wherein the device is a boat.

11. The method of claim 1 wherein the device is a wafer.

12. The method of claim 1 wherein the device is a chip.

13. The method of claim 12 wherein the feature is a controlled collapse chip connection solder bump.

14. The method of claim 12 wherein the feature is a microbump.

15. A method for an inspection procedure, the method comprising the steps of:
   (a) providing a device having a plurality of features;
   (b) obtaining a first image of the device;
   (c) processing the first image using a predetermined background filter, wherein the background filter is selected from the group consisting of: a binary filter, a gray scale filter, an image enhancement filter, and combinations thereof;
   (d) performing a normalizing procedure of the first image, wherein the normalizing procedure is selected from the group consisting of: image resolution processing, scale processing, device rotation processing, and device tilt angle processing;
   (e) providing a second image wherein the second image is a benchmark image for the device;
   (f) after step (e), selecting a first criteria and extracting one or more of the plurality of features in the first image using the selected first criteria;
   (g) dynamically extracting the one or more of the plurality of features in the second image in real time using the same first criteria after the one or more of the plurality of features in the first image have been extracted;
   (h) comparing the extracted one or more of the plurality of features in the first image with the extracted one or more corresponding features in the second image;
   (i) creating an output image comprising the first image with a highlighted area wherein the highlighted area comprises a defect determined from the comparison;
   (j) repeating step (h) for each of the plurality of features;
   (k) repeating steps (f) through (h) and step (j) using a second predetermined criteria;
   (l) classifying each defect by a type of defect according to a predetermined classification system;
   (m) creating a first report including a number of defects by type of defect;

(n) correlating data in the first report with data in a second report created from a second, different inspection method performed on the device; and (o) if the correlation between the data from the first report and data from the second report meets a predetermined acceptable level, updating the second image based on a comparison of the first image with the second image to create an updated benchmark image; and (p) storing the updated benchmark image in a database.

16. A system for inspecting a device having a plurality of features, the system comprising:
   a C-mode scanning acoustic microscope ("C-SAM") to obtain a first image of said device;
   a processor operably connected to said C-SAM wherein said processor is programmed to:
      accept a second image wherein the second image is a benchmark image for the device;
      select a first criteria and extract one or more of the plurality of features in said first image using the selected first criteria;
      dynamically extracting the one or more of the plurality of features in the second image of said device in real time using same first criteria after the one or more of the plurality of features in the first image have been extracted, wherein said second image is a benchmark image for said device;
      compare the extracted one or more of the plurality of features in the first image with the extracted one or more corresponding feature in said second image to thereby identify a defect;
      classify said defect by a type of defect according to a predetermined classification system; and
      create a first report including a number of defects by type of defect;
      correlate data in the first report with data in a second report created from a second, different inspection method performed on the device;
      if the correlation between the data from the first report and data from the second report meets a predetermined acceptable level, update the second image based on a comparison of the first image with the second image to create an updated version of the benchmark image;
   a database operably connected to said processor wherein said database stores said benchmark image and the updated version of the benchmark image; and
   imaging circuitry operably connected to said processor for creating an output image comprising the first image with a highlighted area wherein the highlighted area comprises the defect.

17. The system of claim 16 wherein said processor creates said updated version of the benchmark image based on the comparison of the characterization of one of the plurality of features in said first image with the characterization of the corresponding feature in said second image.

18. The system of claim 16 wherein said processor is further programmed to:
   process said first image using a predetermined background filter; and
   normalize said first image using a normalizing procedure selected from the group consisting of: image resolution processing, scale processing, device rotation processing, and device tilt angle processing.

* * * * *